(No Model.)
E. AINSWORTH.
BOILER AND PIPE COVERING.
No. 246,059. Patented Aug. 23, 1881.
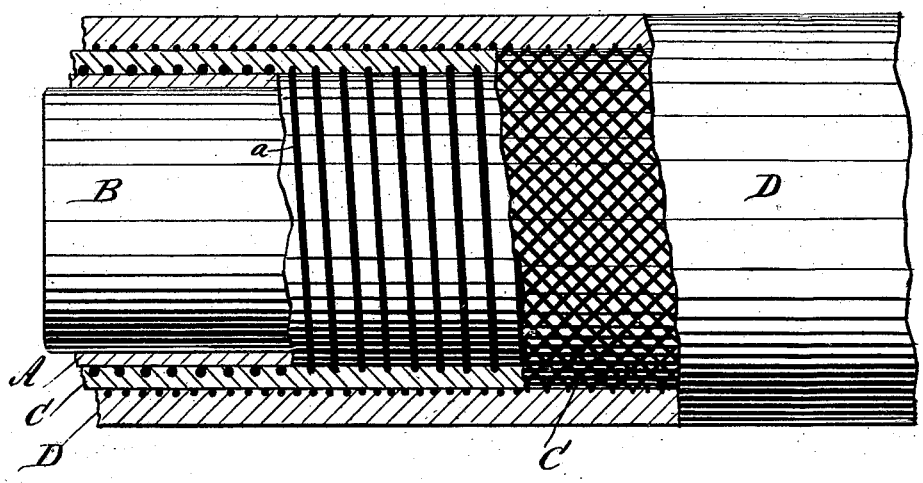
WITNESSES:
A. Schehl.
C. Sedgwick
INVENTOR:
E. Ainsworth
BY Munn & Co.
ATTORNEYS.

UNITED STATES PATENT OFFICE.

ELEAZER AINSWORTH, OF WILMINGTON, DELAWARE.

BOILER AND PIPE COVERING.

SPECIFICATION forming part of Letters Patent No. 246,059, dated August 23, 1881.

Application filed March 8, 1881. (No model.)

*To all whom it may concern:*

Be it known that I, ELEAZER AINSWORTH, of Wilmington, New Castle county, Delaware, have invented a new and useful Improvement in Boiler and Pipe Coverings, of which the following is a specification.

The invention consists in the composition and covering for boilers, steam-pipes, and conductors, made and applied as hereinafter described.

In the accompanying drawing, the figure illustrates, in section, the manner of applying my improved heat-retaining covering.

The first coating, A, placed upon the pipe or boiler B, is formed of a mixture of clay, preferably talcose schist and the fibrous refuse from fleshing, scouring, and trimming after liming or unhairing, and in the finishing of skins in the manufacture of morocco, known as "morocco shavings," in about the proportion of three-fourths in bulk of the clay to one-fourth of the fibrous refuse or shavings, the same to be mixed with sufficient quantity of water to make the mass plastic and adhesive. Around this coating is wrapped the wire *a*. The next coating, C, is composed of a mixture of the fibrous waste from paper-mills or wood-pulp mills, clay, (talcose schist,) and lime in about the proportions of, say, one-half in bulk of the paper-mill or wood-pulp-mill waste, one-quarter clay and one-quarter lime, also to be mixed with sufficient water to make the same plastic and adhesive. This coating is then bound around with the wire-netting *c*, or it may be wound with wire, the same as the first coating. The third and final coating, D, is of the same material as coating C.

In making and applying the covering compound I prefer to follow the method above described; but it is obvious that in the first and in all of the coatings the waste from wood-pulp and paper mills might be mixed with the morocco shavings and the clay or other waste material and not depart from the spirit of my invention.

By this means an efficient heat-retaining covering for boilers and steam-pipes is made from what is now entirely waste material, and is therefore very inexpensive.

Having thus described my invention, I claim as new and desire to secure by Letters Patent—

The boiler-covering herein shown and described, formed of the layer A, composed of a mixture of morocco shavings and clay, and the layers C and D, composed of a mixture of paper-mill refuse or wood-pulp mill refuse and clay and lime, the layers A and C being held by the wire wrapping *a* and *c*, substantially as set forth.

ELEAZER AINSWORTH.

Witnesses:
D. JAMES, Jr.,
STEPHEN DAVIS.